Figure 1:
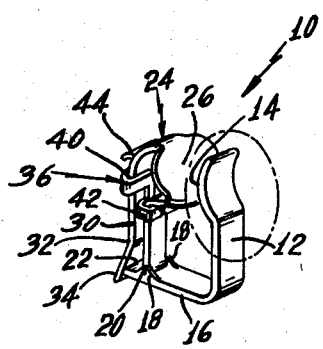

Feb. 23, 1965   E. GROSZ   3,170,212
EAR CLIP
Filed Sept. 16, 1963

INVENTOR.
EUGENE GROSZ
BY Jerome Bauer
ATTORNEY

United States Patent Office 3,170,212
Patented Feb. 23, 1965

3,170,212
EAR CLIP
Eugene Grosz, 387 Grand St., New York, N.Y.
Filed Sept. 16, 1963, Ser. No. 309,146
5 Claims. (Cl. 24—252)

This invention relates to clips and more particularly to clips of the kind used in earrings and as disclosed in United States patent application Serial No. 247,446, filed Dec. 18, 1962, and now abandoned, of which the present application is a continuation-in-part.

The desideratum of this invention is to provide a clip that is capable of being adjusted to vary the tension to be exerted by the clip when it engages an object, as the ear lobe when the clip is used in an earring. Attempts have been made in the past to provide adjustable tension earring clips such as is found in the United States Letters Patent Nos. 2,230,984 and 2,423,905. However, such clips do not provide for a sufficiently long length of adjustment and thereby make it difficult for the user to quickly and easily operate the same to cause it to apply a desired comfortable tension for engagement with the ear lobe.

In the past, clips of the aforementioned type have consisted of a pair of diverging legs over which an adjustment loop or clamp was adapted to be moved. The movement of the loop or clamp was intended to decrease or increase the space between the divergent legs causing them to decrease or increase the tension on an engaged earring supporting bracket. By moving the clamp along the divergent legs, the legs were pulled together when it was desired to increase the tension of the clip or they were permitted to spring apart by sliding the clamp back off the legs when it was desired to decrease the tension applied by the clip. This sliding movement of the clamp along the legs caused a suitable deflection of the legs from their normal diverging relationship. Unless the legs were ungainly and impractically long, the length of adjustment of the clamp along their lengths was miniscule and it was difficult to easily provide a reasonable range of adjustment of tension. Moreover, the clamping deflection of the legs caused the material of which they were formed to fatigue rapidly and to reach its elastic limit after a relatively short period of use. In consequence, the legs lost their elasticity and resiliency such that they could no longer effectively apply the desired engagement tension on the bracket and the ear lobe.

An object of the present invention is to provide a clip of general application, but one that is especially adapted for use with an earring. In carrying forth the invention, an object thereof is the elimination of the problems encountered in the prior art. Accordingly, another object of the present invention is to provide a clip that is capable of offering a larger range of adjustment of tension for engagement with an object, as the ear lobe, than prior known clips without, however, increasing the size thereof beyond that of such other known clips.

A feature of the invention resides in the details of construction which permit quick and easy adjustment and selection of tension to be applied by the clip since the length over which selected adjustment of the clip can be accomplished, is greater than that heretofore provided by known clips.

Still another object of the invention is to provide a clip that will eliminate the problem of exceeding the elastic limit of the material from which the clip is formed thereby providing a clip that will have an increased life and a longer period of operation, one that is inexpensive to manufacture, and a clip in which the operative parts thereof applying the tension engagement have parallel portions which are adapted to be clamped in such manner that they are constantly in parallel relationship irrespective of the tension they are required to apply.

Figure 2:
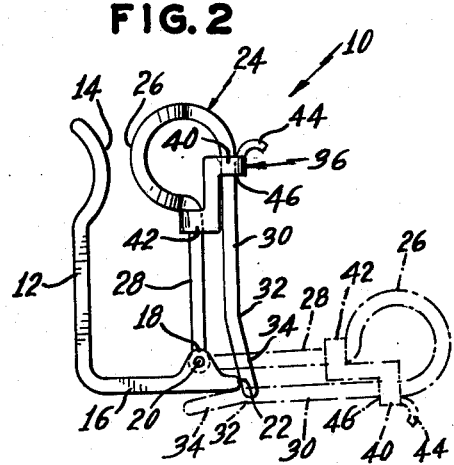
Figure 3:
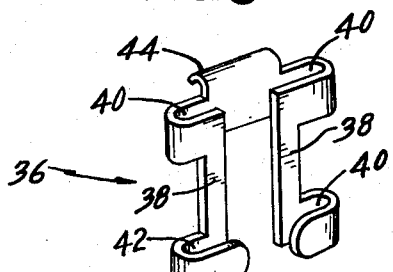
Figure 4:
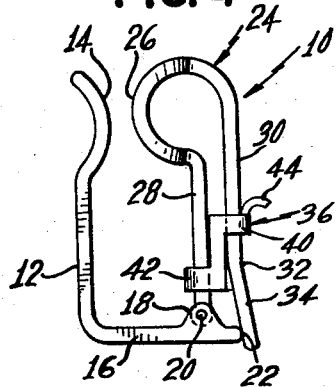
Figure 5:
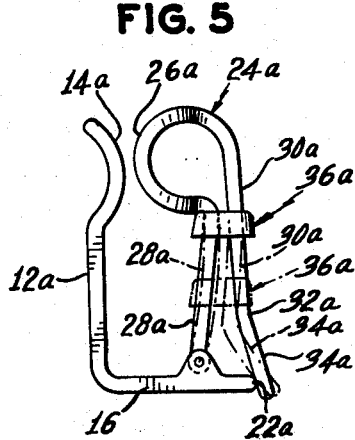

Other and further objects of this invention reside in the structures and arrangements hereinafter more fully described with reference to the accompanying drawing in which:

FIG. 1 is a perspective view of a clip constructed according to the teaching of the present invention, FIG. 2 is an enlarged side elevational view of the clip shown in FIG. 1, FIG. 3 is an enlarged perspective view of the clamp, FIG. 4 is an enlarged side view of the clip in an operation position different from that shown in FIG. 2, and FIG. 5 is an enlarged side elevational view of a clip constructed according to the teaching of the present invention and incorporating the concepts of the prior art.

Referring now to FIGS. 1 to 4 inclusive of the drawing, the adjustable tension clip thereshown is generally identified by the numeral 10. The clip 10 comprises a bracket that is substantially L-shaped and which includes a vertically disposed leg 12 terminating at its upper end in an enlarged, smoothly curved ear engaging portion 14. The horizontal leg 16 of the L-shaped bracket is provided with a pair of laterally spaced upstanding ears 18 each having correspondingly aligned openings, the centers of which define a pivot axis and through which openings a pivot pin 20 is adapted to be inserted. The pivot axis of the ears 18 is located intermediate the vertical leg 12 and the extreme edge 22 of the horizontal leg 16. The edge 22 of the bracket provides a fulcrum surface for a purpose to be described.

A pivot member generally identified by the numeral 24 is formed of a unitary strip of spring or resilient material. It is provided with an enlarged, smoothly curved ear engaging portion 26 that is substantially horizontally aligned with the ear engaging portion 14 of the L-shaped bracket when the pivot member 24 is pivoted to its ear engaging position as shown in FIG. 1 and in full lines in FIGS. 2 and 4. In such operative position, both enlarged ear engaging portions 14 and 26 are adapted to engage on opposite sides of the ear lobe and distribute their force of engagement over their enlarged surfaces when the adjustable tension clip 10 is used as part of an earring.

The pivot member 24 includes a front leg 28 that extends downward from the ear engaging portion 26. The lowermost end of the front leg 28 is connected to the L-shaped bracket at the pivot axis thereof by the pivot pin 20 to enable pivotal movement of the pivot member 24 thereabout. The pivot member 24 also includes a rear leg that extends downward from the opposite side of the ear engaging portion 26. Both the rear and front legs may be said to be bent about themselves and connected together at their one ends in the area of the smoothly curved ear engaging portion 26.

The rear leg extends downward from the portion 26 and has an extent 20 equal in length to the front leg 28. The length 30 of the rear leg is spaced from the equal length of the front leg 28 and in parallel relation therewith. However, the parallel related lengthwise extending portions 28 and 30 of the front and rear legs respectively are linearly offset relative to each other. Thus, the uppermost point on the length 30 of the rear leg corresponds with the uppermost point on the front leg 28 in a linearly offset relationship in such manner that the lowermost point 32 on the length 30 of the rear leg corresponds with the effective lowermost point on the front leg 28.

The lower end of the rear leg is provided with a toe 34 that is contiguous with the lengthwise extending portion 30 and is bent at an angle relative thereto at the lowermost point 32 thereof. The angularly bent toe 34 engages with a selectively variable tension against the edge 22 of the horizontally disposed bracket leg 16 and is adapted to fulcrum thereabout. However, when the pivot member 24 is caused to move about the pivot axis of the pin 20 relative to the bracket, the rear leg thereof is adapted to hingedly move at a point along its lengthwise extending portion 30. This point of hinging movement on the portion 30, or the hinge point, may be selected by the user of the clip upon the operation of a slide clamp generally identified by the numeral 36 and as is more clearly shown in FIG. 3. The normal resiliency of the material from which the pivot member 24 is formed and the loop shaped connection 26 defined between the front and rear legs causes the toe 34 to resiliently constantly engage against the projection or fulcrum edge 22 of the L-shaped bracket.

The slide clamp 36 shown in greatly enlarged detail in FIG. 3 is capable of being formed of a single strip of material wherein the sides 38 are bent inwardly toward each other to form a leg engaging structure in the shape of an incomplete ovally-shaped loop 40. The leg engaging structure 40 is adapted to embrace and slide along the lengthwise extent of the portion 30 of the rear leg of the pivot member 24. Linearly spaced downward from but parallel to the leg engaging structure 40 is an additional incomplete ovally-shaped loop that defines a front leg engaging structure 42. The sides 38 are positioned between the front and rear legs of the pivot member 24.

The slide clamp 36 is adapted to be moved up and down along the equal lengthwise extending portions 28 and 30 of the front and rear legs respectively of the pivot member 24. The vertical or linear offset relationship of the rear leg engaging structure 40 with respect to the front leg engaging structure 42 is equal to the linear offset relationship of corresponding points on the portions 30 and 28 of the rear and front legs of the pivot member 24. Hence, the leg engaging structures 40 and 42 of the clamp 36 are positioned about their respective lengthwise extending portions 30 and 28 of the rear and front legs of the pivot member 24, they aid in retaining such engaged portions in their parallel relationship. The slide clamp 36 includes a manually operable finger 44 that projects outwardly from the back thereof and from beyond the back of the rear leg of the pivot member 24 thereby enabling it to be touched and moved along the slide clamp by light finger pressure.

Inasmuch as the front and rear legs of the pivot member 24 are initially formed in parallel relationship with each other, the slide clamp 36 is not necessarily required to forcefully retain the same in their parallel relationship. Rather, it serves the function of selectively determining the point along the lengthwise extending portion 30 of the rear leg at which the same will hinge during its engagement at its toe 34 with the fulcrum edge 22 of the L-shaped bracket. During assembly of the present invention, the slide clamp 36 is applied to the front and rear legs of the pivot member 24 before the front leg 28 is pivotally mounted at 20 to the L-shaped bracket.

The assembled clip 10, as illustrated in FIGS. 1 to 4, inclusive may be applied to any suitable device. Here, it is assumed that it is to be utilized as a part of a decorative earring. When the slide clamp 36 is in its upmost position as shown in FIGS. 1 and 2, its rear leg engaging structure 40 is positioned within the enlarged opening or area of the loop connecting the front and rear legs of the pivot member 24 as defined by the smoothly curved ear engaging portion 26. The enlarged opening of this connecting portion 26 defined between the front and rear legs is sufficient to accommodate the rear leg engaging structure 40 therein.

The upmost movement of the slide clamp 36 along the legs is limited by its engagement with the base of the portion 26 at its front leg engaging loop structure 42. In such position, the slide clamp 36 defines a hinge point on the lengthwise extending portion 30 about which the same will flex or bend or hingedly move. This hinge point is located at the lower edge of the rear leg engaging structure 40 and is indicated in FIG. 2 by the numeral 46. Thus, the degree of tension applied to the fulcrum edge 22 of the L-shaped bracket by the toe 34 of the rear leg of the pivot member 24 is determined by the length of such rear leg as limited by the location of the hinge point 46 with respect to the fulcrum edge 22.

It must be recognized that the hinge point 46 and the location of the slide clamp 36 defining such hinge point along the lengthwise extending portion 30 of the rear leg does not change or vary the parallel relationship of the front and rear legs. Rather, it merely limits the point along the rear leg at which the same is capable of flexing or bending or hingedly moving when the toe 34 thereof is engaged with the edge 22. Thus, it necessarily follows that if the hinge point 46 is positioned its greatest distance away from the fulcrum edge 22, the toe 34 will engage such edge with a lesser amount of tension than it would if the hinge point 46 were positioned lower along the lengthwise extending portion 30 of the rear leg and closer to the fulcrum edge 22 such as is shown in FIG. 4.

The reason for this should be readily apparent. Although the front and rear legs of the pivot member 24 remain in their parallel relationship, it is the location of the hinge point 46 along the portion 30 of the rear leg that controls the force that the toe 34 will exert and engage with the edge 22. Hence, if the hinge point 46 is closer to the edge 22, there is less length of the rear leg that can pivot about the edge 22 and, therefore, the toe 34 engages the same with a stronger force than it does when the hinge point 46 is more remotely positioned from the edge 22 as shown in FIG. 2.

The offset linear relationship of the lengthwise extending portions 28 and 30 of the front and rear legs of the pivot member 24 permits a larger length of adjustment of the slide clamp 36 therealong than in prior art clips. This is because the upper rear leg engaging structure 40 of the slide clamp 36 is adapted to be accommodated within the connecting portion 26 of the pivot member 24 and, therefore, the full effective lengths of the equal portions 28 and 30 may be utilized during the selective movement of the clamp.

Referring now to FIG. 5, the same illustrates the distinction between the present adjustable tension clip 10 and that of the prior art if the prior art teaching were to be applied to the construction of the instant invention. For ease of understanding and explanation, details of FIG. 5 will be similarly numbered as those of the adjustable tension clip 10 with the addition of the letter "a." For example, the L-shaped bracket structure of the present invention is shown in the same form in FIG. 5. The pivot member 24a is, however, modified in accordance with the teachings of the aforementioned Patents 2,230,-984 and 2,423,905 wherein divergent legs are looped together by a sliding clamp 36a.

In such case, it will be noted that the fullest lengthwise extent of adjustment of the sliding clamp 36a is materially less than that afforded by the present adjustable tension clip 10. The extent of adjustment of the clamp 36a is limited at its upper movement by the portion 26 and to its lowermost movement by the point of juncture 32a. Because the length of adjustment of the loop clamp 36a is so much shorter than that permitted by the teaching of the present invention, it is difficult for the user to adjustably select the proper tension to be applied by the clip without exerting great care. Furthermore, the range of tension that can be applied by the clip of FIG. 5 is not as large as that obtainable by the adjustable tension clip 10 of the present invention.

It will also be recognized by those skilled in the art that because the fixed loop clamp 36a operates along the length of diverging legs, it must pull the diverging legs toward each other as it is slid downwardly therealong. In so doing, the diverging legs are deflected inwardly toward each other from their normal relation to their dash line position as shown in FIG. 5. Hence, after a short period of use and of pivoting movement of the pivot member 24a about the pivot pin 20a, the deflected rear leg 30a will soon be so tensioned and worked as to become fatigued rapidly and reach its elastic limit. At that time, the leg loses its resiliency and the toe 34a no longer operates with sufficient force to engage the fulcrum edge 22 for any useful purpose.

By the unique arrangement of the parallel but linearly offset relationship of the front and rear legs provided on the pivot member 24, and of the moving relationship of the slide clamp 36 therealong, the present invention provides an adjustable tension clip 10 that overcomes the problems of the prior art. The adjustable tension clip 10 of the present invention does not rely upon the deflection of the legs of the pivot member, but rather upon the selective movement, location and variation of the hinge point 46 along the length 30 of the rear leg to vary its effective length to selectively control the force with which the toe 34 will engage the fulcrum edge 22. In consequence, the force with which the horizontally aligned enlarged smoothly curved ear engaging portions 14 and 26 will engage the ear lobe when the same is utilized as part of an earring can be controlled to suit the desires of the user.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A bracket having a pivot axis and a projection, a pivot member having two legs, one of said legs being pivotally connected with said bracket for pivotal movement relative to said bracket about said pivot axis, the other of said legs being engaged with said projection to fulcrum thereabout, each of said legs having a length thereof parallel with and spaced relative to the other, and a clamp movable in the space between said legs and including means engaging each of said legs and slidable along the parallel lengths thereof to retain the same in their parallel spaced relationship and adjustably vary the effective legnth of said other of said legs to selectively vary the tension between said other leg and said projection during the fulcruming movement of said other leg about said projection.

2. An adjustable tension clip comprising a bracket having a pivot axis and a fulcrum edge each relatively spaced from the other, a pivot member including two legs, one of said legs being pivotally connected with said bracket for pivotal movement of said member about said pivot axis and the other of said legs engaging said edge for fulcruming movement thereabout, said other of said legs having a hinge point along the length thereof at which the same hingedly moves during said fulcruming movement, and a clamp movable between said legs and including means slidably engageable along portions of the lengths of said legs to vary the location of said hinge point along said other of said legs to variably tension the engagement of said other of said legs with said edge, said portions of said lengths of said legs slidably engageable by said clamp being spaced parallel with and relative to each other.

3. An adjustable tension clip for an earring comprising a substantially L-shaped bracket having a smoothly curved ear engaging portion at the upper end of the vertical leg of said bracket, a pivot axis on said horizontal leg of said bracket spaced intermediate said vertical leg and the edge thereof, a pivot member having a smoothly curved ear engaging portion substantially horizontally aligned with said ear engaging portion of said bracket when said pivot member is pivoted to its ear engaging position to engage an ear lobe between said portions, a front leg on said pivot member extending downward from said ear engaging portion thereof, pivot means connecting said front leg to said bracket at said pivot axis thereof for pivotal movement of said pivot member thereabout, a rear leg on said pivot member extending downward from said ear engaging portion thereof and having an extent of its length spaced from and parallel to said front leg and hingedly engaging said edge of said horizontal leg for adjustable tensioned engagement therewith and for sliding movement thereover, a slide engaging said front and rear legs and movable along the parallel lengths thereof to vary the effective extent of the length of said rear leg to variably select a point therealong about which said rear leg will hingedly move during its movement over said edge and to variably adjust the tension of engagement between said rear leg and said edge, and said pivot member ear engaging portion defining an open area between said front and rear legs to accommodate said slide therein to increase the effective length of engagement of said slide with said rear leg.

4. An adjustable tension clip comprising a bracket having a pivot axis and a fulcrum edge spaced from said pivot axis, a pivot member including a pair of relatively spaced legs each connected with the other at one of their ends, said connection defining an enlarged open area at said one end of said legs, each of said legs having corresponding lengthwise extending portions spaced parallel with and offset linearly relative to each other, one of said legs being pivotally connected with said bracket at its other end for movement of said pivot member about said pivot axis, the other of said legs engaging said fulcrum edge at its other end for exerting an adjustable tension thereagainst, said lengthwise extending portion of the other of said legs having a hinge point about which the same is adapted to hingedly move during its engagement with said fulcrum edge, and a slide movable along said legs and engageable with correspondingly related offset linear points on each of said legs to vary the location of the hinge point along said other of said legs to cause the same to exert a variable tension against said fulcrum edge, said slide having said portion thereof engaged with said other leg positioned in said enlarged open area when the same engages the one end of said lengthwise extending portion of said other leg.

5. In an adjustable tension clip, a pivot member having a pair of legs formed of a strip of resilient material and connected at one of their ends, each of said legs having a substantially equal lengthwise extending portion, said portions each being parallel with the other and corresponding points along the portion of one of said legs being linearly offset relative to the other, said lengthwise extending portion of one of said legs being adapted to flex along a point thereof to permit the same to hingedly move at said point to exert a selected tension at its other end, and a selectively movable slide having two leg engaging structures thereon each spaced parallel with the other and linearly offset relative to the other, said leg engaging structures each engaging a respective one of said lengthwise extending portions of said legs at equally distant linearly offset points corresponding to the linear offset of the respectively lengthwise extending portions of said legs whereby the selected point of engagement of said engaging structure along the lengthwise extending portion of said one leg is variable to select the point thereof at which the same hingedly moves to correspondingly cause the same to apply a selective tension at its other end.

References Cited by the Examiner

UNITED STATES PATENTS

| | | |
|---|---|---|
| 1,967,965 | 7/34 | Morehouse et al. |
| 2,230,984 | 2/41 | Chernow _ _ _ _ _ _ _ _ _ _ _ _ 24—252 X |
| 2,423,905 | 7/47 | Schuler. |
| 2,728,968 | 1/56 | Scharff et al. _ _ _ _ _ _ _ _ _ _ _ 24—252 |

DONLEY J. STOCKING, *Primary Examiner.*